(No Model.) 7 Sheets—Sheet 1.

H. H. CUMMINGS.
BUTTON SEWING MACHINE.

No. 397,588. Patented Feb. 12, 1889.

WITNESSES.
INVENTOR.

(No Model.) 7 Sheets—Sheet 5.

H. H. CUMMINGS.
BUTTON SEWING MACHINE.

No. 397,588. Patented Feb. 12, 1889.

WITNESSES
A. D. Grover
C. B. Crocker

INVENTOR
H. H. Cummings
by Wight, Brown & Crosby
attys.

(No Model.) 7 Sheets—Sheet 6.

H. H. CUMMINGS.
BUTTON SEWING MACHINE.

No. 397,588. Patented Feb. 12, 1889.

WITNESSES.
A. D. Grover
C. P. Crocker

INVENTOR
H. H. Cummings
by Wright, Brown & Crosley
attys.

(No Model.) 7 Sheets—Sheet 7.

H. H. CUMMINGS.
BUTTON SEWING MACHINE.

No. 397,588. Patented Feb. 12, 1889.

Witnesses:
W. C. Ellis.
O. C. Ramsay.

Inventor,
H. H. Cummings.
By Wright, Brown & Crosley,
Attys.

UNITED STATES PATENT OFFICE.

HENRY H. CUMMINGS, OF MALDEN, ASSIGNOR TO THE UNION BUTTON SEWING MACHINE COMPANY, OF BOSTON, MASSACHUSETTS.

BUTTON-SEWING MACHINE.

SPECIFICATION forming part of Letters Patent No. 397,588, dated February 12, 1889.

Application filed May 16, 1887. Serial No. 238,363. (No model.)

*To all whom it may concern:*

Be it known that I, HENRY H. CUMMINGS, of Malden, in the county of Middlesex and State of Massachusetts, have invented certain new and useful Improvements in Button-Sewing Machines, of which the following is a specification.

My invention has relation to button-sewing machines of the class designed to sew on buttons having eyes or holes extending through from side to side of the button, and for performing cross, bar, and other stitching.

It is the object of my invention to so improve button-sewing machines that the mechanism for moving the button and cloth carrier or holder shall be placed wholly beneath the bed of the machine, leaving the upper surface of the bed free from such mechanism, so that the goods being operated upon can be manipulated unhindered by the means for shifting the button-carrier, usually arranged above the bed-plate.

It is also the object of my invention to provide means whereby the button-carrier may be reciprocated bodily in one direction and in like manner reciprocated in a direction at right angles to that first mentioned.

It is also the object of my invention to provide a construction whereby interchangeable pattern-disks may be employed in the same machine for the purpose of producing stitching of varying character or design.

It is also the object of my invention to produce other improvements having as their purpose the simplification of an organized button-sewing machine, as also the increasing of the capacity of such machine.

I will now proceed to describe my improvements, so that others skilled in the art to which they pertain and with which they are connected may be able to make and use the same, reference being had to the accompanying drawings, and to the letters of reference marked thereon, forming a part of this specification, and in which the same letters indicate the same parts wherever they occur.

In the drawings, A represents the bed of the machine; B, the overhanging arm; C, the main shaft; D, the needle-shaft; E, the link or pitman connecting the main shaft with the needle-shaft, and F the reciprocating needle-bar. These parts may be the same as in button-sewing machines of common construction, and other parts necessary to properly equip a sewing-machine, having nothing to do with my invention, and known to all acquainted to any extent with machines of this class, may be supposed to be added, if not clearly shown and described.

$a$ represents the button-carrier, consisting of the button-holder $a'$, secured to the forward end of an arm, $a^2$, and adapted to be pressed upon the button-holder support $a^3$, consisting of a strip of spring-steel or similar metal secured at its outer end to the return bent end $a^4$ of arm $a^2$. The construction of these parts is such that the button may be placed and held by the button-holder, and the cloth or material upon which the button is to be sewed is held between the button-holder $a'$ and button-holder support $a^3$. When bar or other stitching is to be done, the cloth or other material is held in the button-carrier without, of course, placing a button in the button-holder.

$b$ represents a presser rod or bar extending between the free end of a spring, $b'$, secured to the overhanging arm B and the button-holder $a'$ to keep the latter pressed down on the support $a^3$ when the machine is being operated. The end of the return bent portion $a^4$ of the button-holder is pivoted to a block, $c$, as at $c'$, rigidly secured to a shaft, $d$, having suitable bearings in the bed or brackets attached to the bed of the machine. Said shaft $d$ is adapted to be both rocked and moved longitudinally in its bearings, so that the button-carrier may be bodily moved longitudinally—that is, in the direction of the arrow 2—and laterally—that is, in the direction of the arrow 3—on the bed of the machine, by which movements I effect the several results illustrated in Figs. 9$^a$, 10$^a$, 11$^a$, and 12$^a$, and modifications thereof, and the means for effecting the described movements of shaft $d$ and through it the button-carrier $a$ will next be described.

$e$ represents a worm-gear mounted and adapted to turn on a stud, $e'$, secured to the bed of the machine, said worm-gear being engaged and rotated by a worm, $e^2$, on shaft C. Secured in any suitable manner to (preferably) the under side of worm-gear $e$ are two pattern disks or wheels, $f$ $g$. I term these devices "pattern-disks" for the reason that they are disks with peripheries of different conformation or pattern, said patterns governing the movements of the button-carrier and determining the nature or character of the work or stitch.

Figure 5:
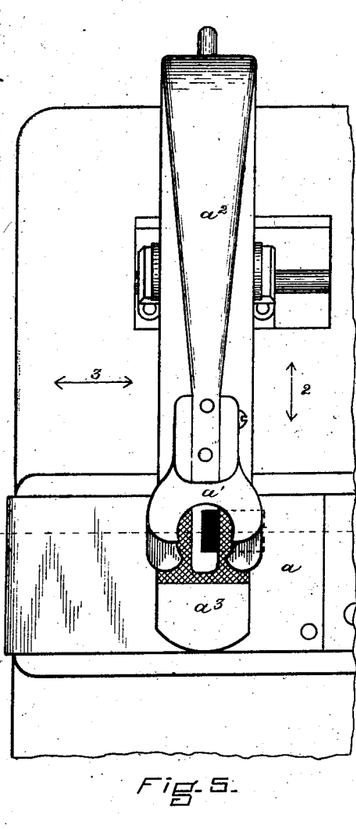
Figs. 5, 6, and 7 are diagrams representing different positions of the button-carrier on the needle-plate, indicating the manner in which a button may be moved to different positions in order to perform the stitching designed to be accomplished by my invention.
Figure 14:
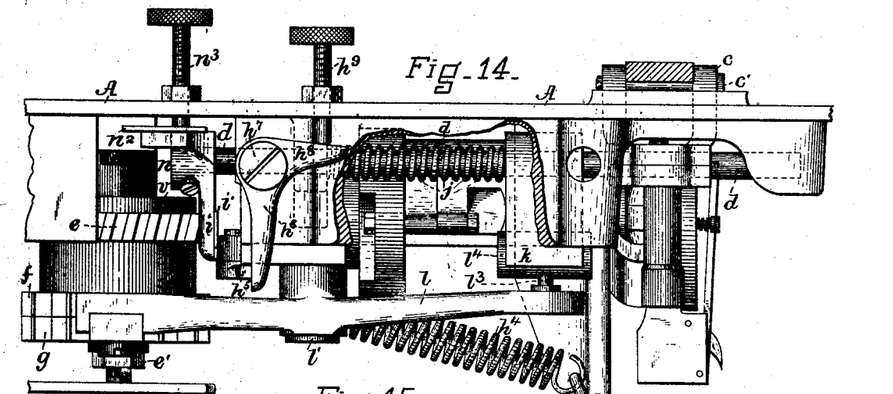
Fig. 14 is a front view, part of the bed being shown as broken out.
Figure 15:
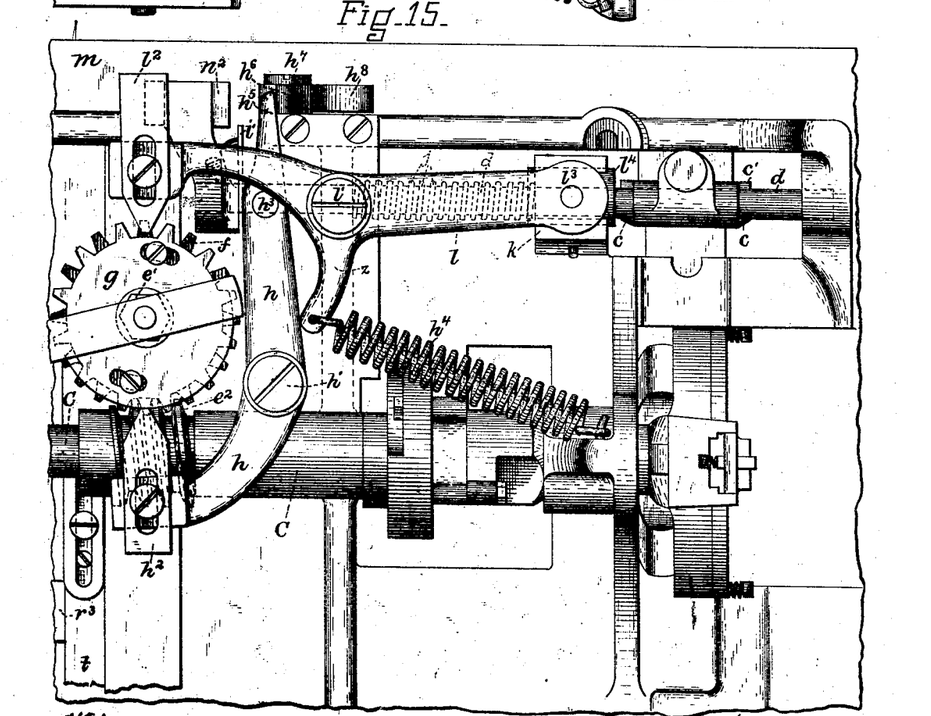
Fig. 15 is a plan view of the mechanism for moving and controlling the movements of the sliding rock-shaft connected with the button-carrier.

$h$ indicates a lever, pivoted at $h'$ to any stationary part of the machine, and provided on its inner end with an adjustable finger, $h^2$, arranged to bear against the periphery of pattern-disk $g$. At its opposite or forward end lever $h$ is provided with a bowl or roller, $h^3$, arranged to bear against the cross arm or bar $i'$ on the lower end of arm $i$ of bell-crank lever $n$, secured to the rear end of shaft $d$. A spring, $j$, surrounding shaft $d$, and to be presently described, operates to press said shaft and its connected crank-lever $n$ in the direction of arrow 1, Fig. 2, and as a result serves to hold finger $h^2$ on the rear end of lever $h$ in contact with the periphery of pattern-disk $g$, and also to hold the pin or finger $h^5$, projecting forward from the outer end of the lever $h$, against the downwardly-extending arm $h^6$ of a small angular or bell-crank lever pivoted at $h^7$ to the bed of the machine, the laterally-extending arm $h^8$ of said lever being arranged to bear on the lower end of a stop-screw, $h^9$, as most clearly portrayed in Figs. 1 and 14, which stop-pin $h^9$ and bell-crank lever $h^7$ limit the movement of rod $d$ in the direction of arrow 1, Fig. 2. A spiral spring, $j$, before referred to, surrounds shaft $d$ and bears at one end against a yoke-block, $k$, secured to said shaft, and at the other end against any stationary part of the bed or frame, and operates with a tendency to move said shaft $d$ in the direction of the arrows 1 and 4, Figs. 1 and 2, as before mentioned. With this construction and arrangement of parts it will be seen that as pattern-wheel $g$ is rotated its teeth $g'$, having reference to Fig. 9, coming in contact with the end of finger $h^2$, resting against the periphery of said pattern-wheel, will rock lever $h$ on its pivot and fulcrum $h'$, and the forward end of the latter device, acting on cross arm or bar $i'$ on the lower end of arm $i$ of bell-crank lever $n$, secured to shaft $d$, will move said shaft and the button-carrier attached thereto, as aforesaid, in a direction opposite to the flight of arrows 1 and 4, Figs. 1 and 2, spring $j$ effecting a movement of said parts in the opposite direction, when finger $h^2$ passes a tooth, $g'$, and drops into a notch or on a depressed part, $g^2$, of said wheel $g$. The two movements just described of shaft $d$ and button-carrier $a$ are those indicated by the double-headed arrows 3 in Figs. 5, 6, and 7.

$l$ represents a lever pivoted at $l'$ to any stationary portion of the bed and provided at its rearward end with an adjustable finger, $l^2$, similar to finger $h^2$ of lever $h$, which finger $l^2$ is arranged to bear against the periphery of pattern-disk $f$. At its forward end lever $l$ is provided with a pin, $l^3$, extending upward into a horizontally-arranged stud, $l^4$, in the fork or rounded groove in the lower end of yoke-block $k$. By connecting lever $l$ with shaft $d$ in the manner described said shaft may be rocked in its bearings through the medium of lever $l$ and yoke-block $k$ when the former is oscillated on its pivot $l'$ without interfering with the longitudinal movements of said shaft, as before explained, and the oscillating movement of said lever $l$ is secured by the contact of finger $l^2$ with the periphery of pattern-wheel $f$, the raised surfaces on said pattern-wheel moving the forward end of lever $l$ in the direction of the arrow 5, Fig. 2, moving the button-carrier in the opposite direction on the bed or needle plate, and a spring, $h^4$, connected at one end to the inner end of an arm or pin, $z$, secured to lever $l$ and at the other end to a stationary part of the machine, moving said lever, button-carrier, and intermediate devices in the opposite direction when finger $l^2$ is brought to position where it can fall on a depressed surface of the periphery of pattern-disk $f$. Shaft $d$ is provided at its rear end, as stated, with a small bell-crank lever, $n$, one arm, $n'$, of which extends down behind lever $l$, and the other, $n^2$, extends outward under the lower end of a stop-screw, $n^3$, and limits primarily the rocking of the shaft $d$, thereby controlling the movement of the button-carrier, as will be understood without further description.

Figure 6:
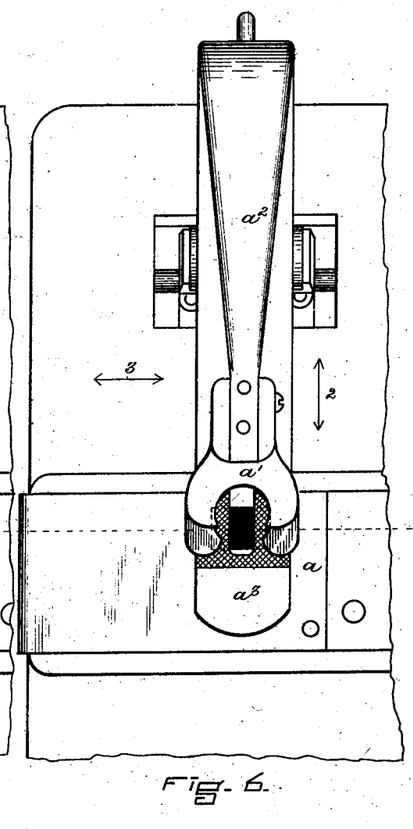
Figure 7:
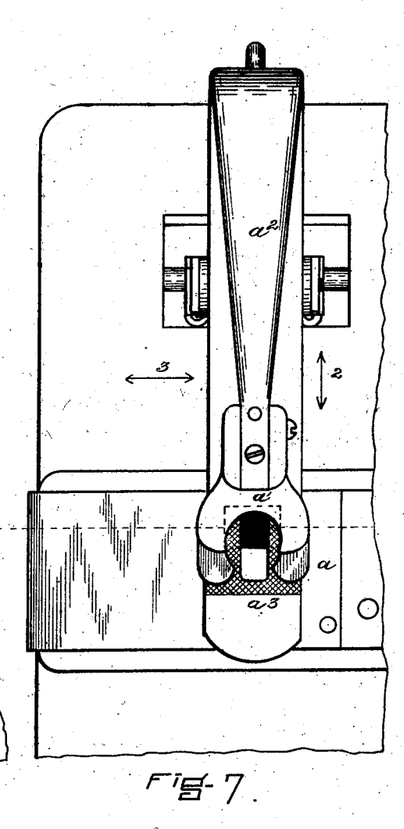
Figure 8:
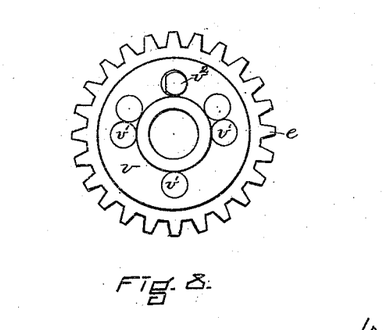
Fig. 8 is a top plan view of the worm-wheel and its attached pin, hub, or disk, comprising the means whereby the latch of the shipping-rod may be tripped in order to permit the stop-motion mechanism to operate to stop the machine.
Figure 9A:
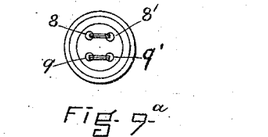
Fig. 9 is a bottom plan view of the pattern-disks adapted to be attached to the worm-wheel to effect the movement of the button holder or carrier, so as to sew on a four-eyed button with a parallel bar-stitch, as represented in Fig. 9$^a$.

With the explanation thus far given it will be seen that if the machine were equipped with pattern-wheels $f$ and $g$ of the form shown in Fig. 9, with the end of finger $l^2$ on the raised part of the periphery of pattern-disk $f$ at the point $f'$ and finger $h^2$ on the periphery of pattern-disk $g$ at a point substantially opposite the point $f'$, with a four-eyed button in the button-carrier and the latter in the rearward position, as represented in Fig. 6, and the machine set in motion, sewing would be accomplished alternately through the eyes 9 9′ of the button shown in Fig. 9ª, the button-carrier being reciprocated in the direction of the double-headed arrow 3, so as to properly present said eyes of the button to the needle by means of the longitudinal movements of rod $d$, accomplished by spring $j$ and the contact of finger $h^2$ of lever $h$ with the teeth or projections $g'$ of pattern-disk $g$, and the operation would be proceeded with in this manner until finger $l^2$ reached the point $f^2$ and dropped on the depressed surface of the periphery of pattern-disk $f$, when spring $h^4$ would operate lever $l$ to shift the button-carrier from the position in which it is represented in Fig. 6 to that pictured in Fig. 7, when sewing will take place through the holes 8 8′ of the button shown in Fig. 9ª until said finger $l^2$ arrives at the point $f'$, when the machine will be stopped, in a manner to be presently explained.

Figure 10:
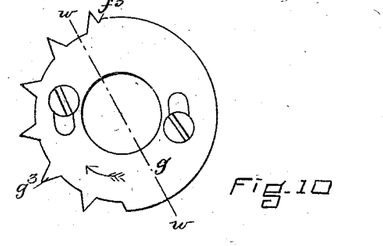
Fig. 10 is a bottom plan view of the parts shown in Fig. 9, the pattern-disks being formed so as to sew on a four-eyed button with a cross-stitch, as represented in Fig. 10$^a$.
Figure 13:
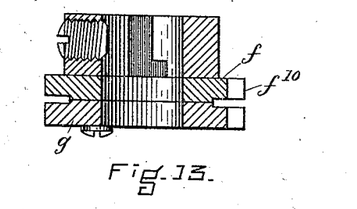
Fig. 13 is a sectional view taken on the line $w\ w$, Fig. 10.

In sewing on a four-eyed button with a cross-stitch, as represented in Fig. 10ª, pattern-disks $f$ $g$ of the form represented in Fig. 9 will be removed and replaced with pattern-disks of the form pictured in Fig. 10. In this case finger $l^2$, riding over the teeth $f^{10}$, (see Fig. 13,) formed on the periphery of pattern-disk $f$, will operate to reciprocate the button-carrier in the direction indicated by the double-headed arrows 2 in Figs. 5, 6, and 7, causing the needle to stitch through the eyes 7 7′ of the button represented in Fig. 10ª, the finger $h^2$ riding meanwhile upon the plain portion of the periphery of disk $g$ until said finger $l^2$ at the point $f^3$ drops on the lower plain part of the periphery of pattern-disk $f$, when finger $h^2$, coming in contact with the teeth $g^3$ on the periphery of disk $g$, will reciprocate the button-carrier in the direction of the double-headed arrows 3 and effect stitching through the eyes 6 6′ of the button shown in Fig. 10ª.

Figure 11:
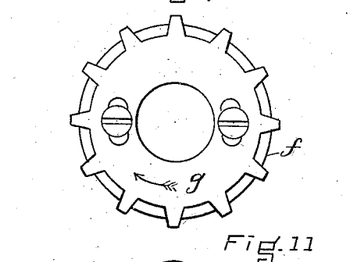
Fig. 11 is a bottom plan view of the parts shown in Fig. 9, the pattern-disks being formed to sew on a two-eyed button, as represented in Fig. 11$^a$.
Figure 11A:
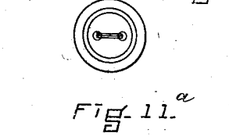

In Fig. 11 the periphery of the pattern-disk $f$ is shown to be plain throughout, so as not to cause finger $l^2$ to effect any movement of the button-carrier in the direction of the arrows 2 while finger $h^2$ is being brought into contact alternately with the raised and depressed surfaces of the periphery of pattern-disk $g$, and so effect the movement of the button-carrier laterally or in the direction of the arrows 3, and so effect sewing through the eyes of the two-holed button shown in Fig. 11ª.

Figures 10A, 12:
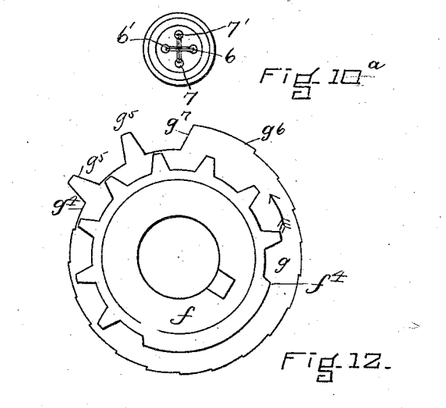
Fig. 12 is a top plan view of the parts shown in Fig. 9, the pattern-disks being constructed to effect the barring of a seam, as represented in Fig. 12$^a$.
Figure 12A:
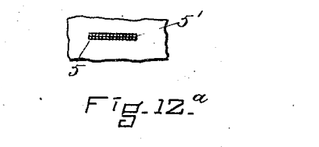

The pattern-disks $f$ $g$ (shown in Fig. 12) are designed to effect the "barring" of a seam, as at the corner of a pocket, and as represented in Fig. 12ª. In this case, supposing finger $l^2$ to be resting on the plain surface of disk $f$ at the point $f^4$, with finger $h^2$ on the periphery of disk $g$ at the point $g^4$, and said disks to be rotated in the direction of the arrow, the teeth $g^5$ $g^5$, coming in contact with finger $h^2$, will reciprocate the button-carrier (now holding the cloth or garment) laterally, taking two or three stitches from the point 5 to the point 5′, as represented in Fig. 12ª, when the said finger $h^2$ will ride up the inclined surface $g^7$ of pattern-disk $g$ on the raised but gradually-descending periphery $g^6$ of said disk, the cloth being held so that the needle shall have taken its last stitch at the point 5′ of the bar represented in Fig. 12ª, when finger $l^2$, coming in contact alternately with the raised and depressed surfaces of the periphery of the disk $f$, will reciprocate the button-carrier in the direction of the double-headed arrows 2, and so effect a stitching across the bar-stitches between the points 5 5′, the finger $l^2$ riding down the gradually-descending periphery of the pattern-disk $g$, resulting in feeding the cloth along, so as to effect the stitching across the bar from one end to the other, as described. In this way I am enabled to perform the different stitching for the sewing on of buttons of different structural character or of the same structural nature with a different stitch, or bar a seam or corner of a pocket, &c., the form of the stitch depending on the form of the pattern-disks employed, which may be readily removed from and replaced on the journal-stud of worm-wheel $e$.

I have explained that the machine is stopped after a button has been sewed on or other work accomplished, as hereinbefore explained, and this result is performed automatically in a manner next to be explained.

Figure 1:
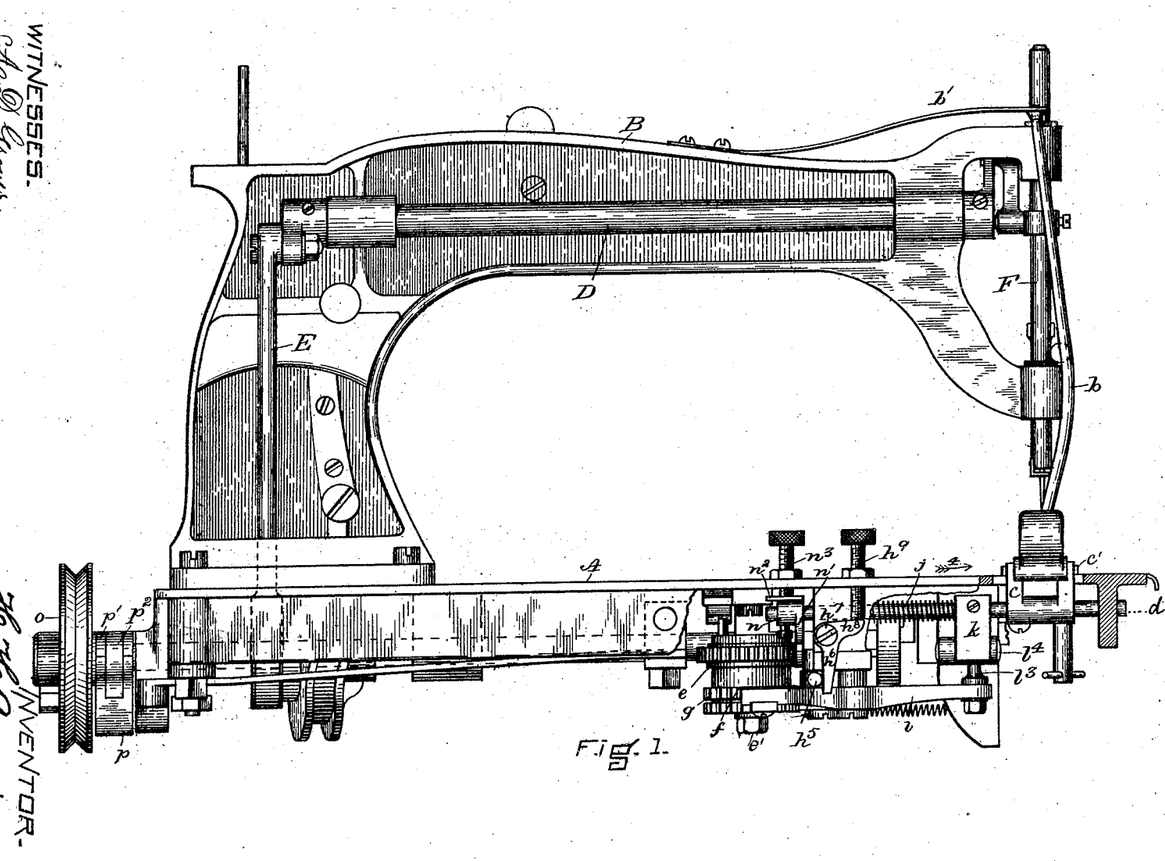
Figure 1 represents a side elevation of my improved button-sewing machine, parts being shown in section and other parts being pictured as broken away.
Figure 2:
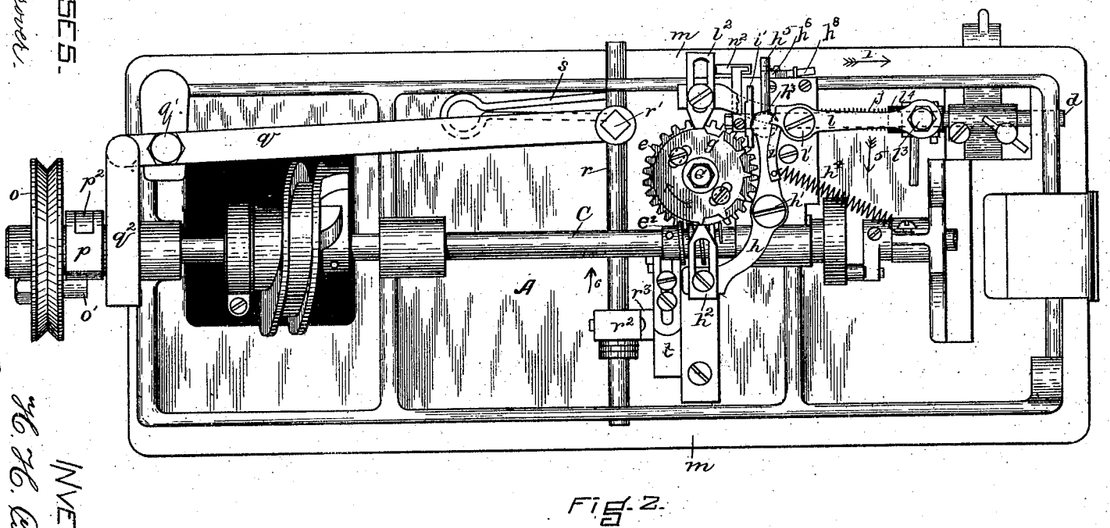
Fig. 2 is a bottom plan view of the machine, portions being shown as broken away.
Figure 3:
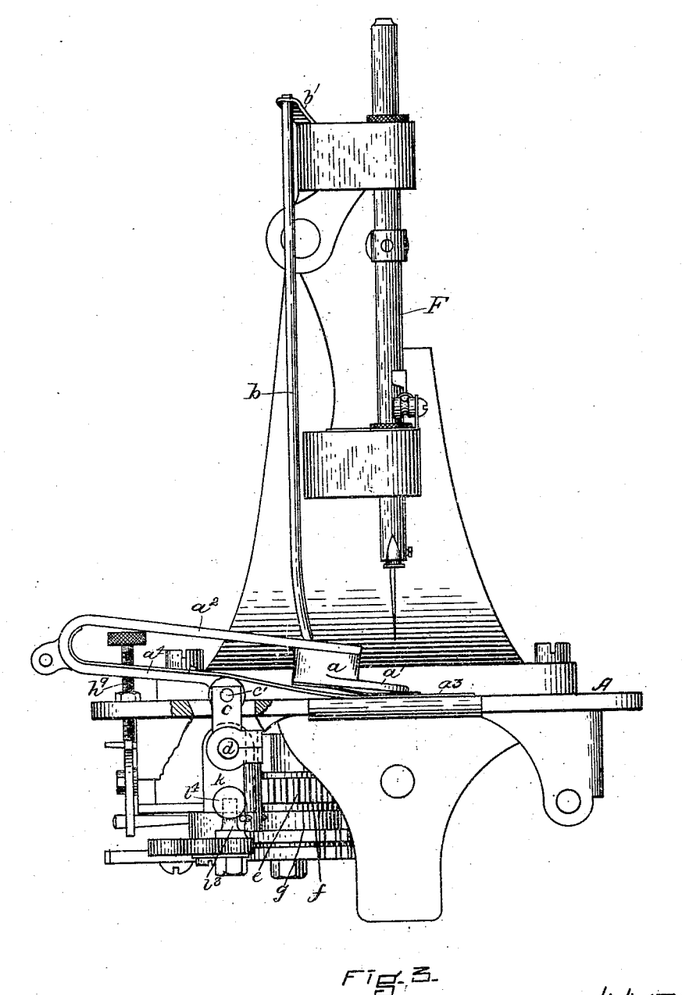
Fig. 3 is a front end elevation of the machine, partly in section, and parts being shown as broken away.

The belt-receiving pulley $o$ is adapted to run loose on the main shaft C, and is provided with a laterally-projecting stud, $o'$, adapted in the rotation of the pulley to engage a dog, $p$, pivoted on a collar, $p'$, secured to the main shaft, and held pressed outwardly in its normal position, as represented in Figs. 1 and 2, so as to be engaged by said pin $o'$, by a spring, $p^2$.

$q$ indicates an elbow-lever pivoted at $q'$ to the bed of the machine, and adapted to be moved on its pivot or fulcrum, so as to bring its arm $q^2$ within the path of travel of dog $p$ and be also moved out of said path. When moved into the path of travel of dog $p$, the latter is pressed inward against the stress of its spring $p^2$, so as to allow pin $o'$ of pulley $o$ to pass without effecting a rotation of the main shaft; but when the dog $p$ is free, as shown in Figs. 1 and 2, pin $o'$ will engage therewith in the rotation of pulley $o$, and so operate the machine.

The free end of the main arm of elbow-lever $q$ is pivoted, as at $r'$, to a shipping-rod, $r$, suitably supported in the bed of the machine, so as to be moved longitudinally in its bearings, and normally pressed outwardly in the direction of arrow 6 by means of a spring, $s$, bearing thereagainst. (See Fig. 2.)

Figure 4:
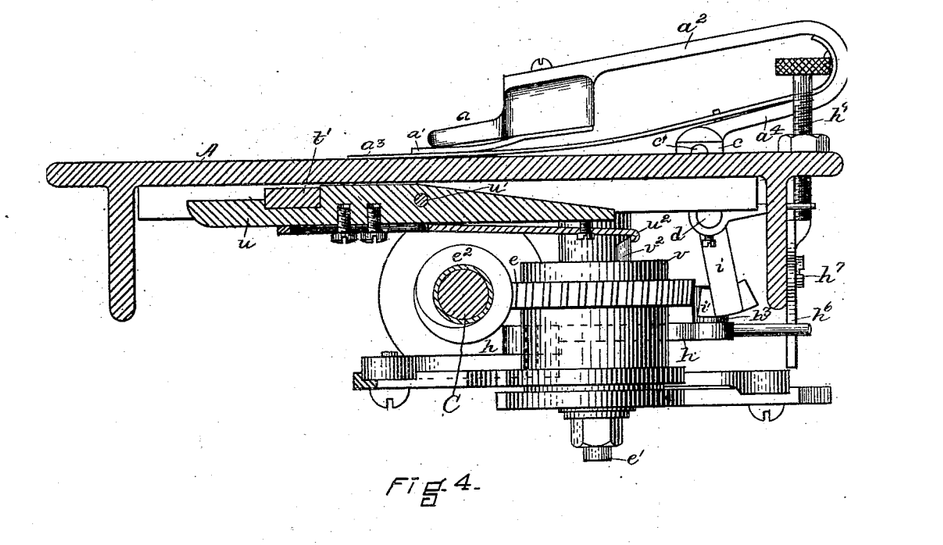
Fig. 4 is a sectional view on the line $m\ m$, Fig. 2, looking in the direction of the arrow 1.

Shipping-rod $r$ has a block, $r^2$, secured thereto toward its rear end, which block is provided with a lateral extension, $r^3$, adapted to be caught behind an offset (not shown) of a latch-finger, $t$, pivoted to the bed of the machine, and connected by means of a cross-piece, $t'$, Fig. 4, with latch-tripping lever $u$, also pivoted to the bed of the machine, as at $u'$. The inner end of lever $u$ or an adjustable finger, $u^2$, thereon extends over worm-wheel $e$, which is provided with a hub or disk, $v$, having holes $v'$, adapted to receive a tripping-pin, $v^2$, so positioned as that in the rotation of said worm-wheel to be brought into contact with the inner end of lever $u$ or its attached adjustable finger $u^2$, rock said lever on its fulcrum $u'$, and through the medium of cross-piece $t'$ rock latch-finger $t$ on its pivot against a spring (not shown) which holds it in its normal position, and so permit shipping-rod $r$ to be moved by spring $s$ and move elbow-lever $q$ to stop the machine, as before described. This stop-motion mechanism constitutes no part of my present invention, and will therefore not be specifically claimed herein, as any other known or suitable stop-motion mechanism might be employed that is or would be capable of being tripped by pin $v^2$ in the rotation of worm-gear $e$ and its hub or disk $v$.

By providing numerous holes, $v'$, in disk or hub $v$ an arrangement is made whereby the machine may be stopped at any point in the rotation of wheel $e$, and by providing two or more pins, $v^2$, the machine may be stopped two or more times to each rotation of said wheel.

The machine shown may be supposed to be of the class known as "revolving-hook" machines, the sewing mechanism of which is so well known as not to require description or illustration, though it is obvious that a machine equipped with different sewing mechanism may be employed in connection with my improvements, which have alone to do with the button-carrier and the means for shifting or moving it in order to present a button or material, or both, held thereby so as to present the same in proper position relatively to the needle.

The set or stop screws $n^3$ $h^9$ operate in a manner which will be well understood to regulate the length of the stitch taken in all directions, the contour of the surfaces of the pattern-disks operating also with the same result.

It is obvious that changes may be made in the form and arrangement of parts constituting my improvements within the province of mechanical skill without departing from the nature or spirit of the invention.

Having thus described my invention, what I claim is—

1. A sewing-machine bed and a sewing mechanism, combined with a button-carrier constructed and arranged to reciprocate on the bed, a shaft, $d$, and its bearings beneath the bed, said shaft being longitudinally movable in its bearings and connected with the button-carrier through an opening in the bed, a rotary pattern disk or device, and a pivoted lever, $h$, arranged to be actuated by said pattern device and connected with said shaft, whereby the latter may be operated and the button-carrier moved in line with the axis of the shaft, substantially as hereinbefore set forth.

2. A sewing-machine bed and a sewing mechanism, combined with a button-carrier constructed and arranged to reciprocate on the bed, a rock-shaft, $d$, beneath the bed and connected with the button-carrier through an opening in the bed, a rotary pattern disk or device, and a pivoted lever, $l$, arranged to be actuated by said pattern device and connected with said rock-shaft, whereby the rock-shaft may be operated and the button-carrier moved at right angles to the axis of the rock-shaft, substantially as hereinbefore set forth.

3. A sewing mechanism, combined with a button carrier, a rock-shaft and its bearings, said rock-shaft being longitudinally movable in its bearings and connected with the button carrier, two rotary pattern disks or devices, and two pivoted levers arranged to be actuated by said pattern device and connected with said rock-shaft, substantially as hereinbefore set forth.

4. A sewing mechanism, combined with a button-carrier, a rock-shaft and its bearings, said rock-shaft being longitudinally movable in its bearings and connected with the button-carrier, a rotary shaft, a worm thereon, a worm-gear actuated by said worm, interchangeable pattern-disks connected with said worm-gear, levers intermediate of said pattern-disks and longitudinally-movable rock-shaft and actuated by said disks, said levers being connected with said shaft, whereby said shaft may be rocked and moved longitudinally in one direction, and springs to move said shaft in the opposite direction, substantially as hereinbefore set forth.

5. The bed of a button-sewing machine and a sewing mechanism, combined with a button-carrier located upon or above the bed, a rock-shaft and its bearings located below the bed, said rock-shaft being longitudinally movable in its bearings, and connections between the rock-shaft and button-carrier, whereby the bed of the machine may be left free of means for operating the button-carrier, and by rocking said shaft and moving it longitudinally in its bearings the button-carrier may be moved to properly present the button to the needle of the sewing mechanism, substantially as hereinbefore set forth.

In testimony whereof I have signed my name to this specification, in the presence of two subscribing witnesses, this 9th day of May, A. D. 1887.

HENRY H. CUMMINGS.

Witnesses:
C. F. BROWN,
ARTHUR W. CROSSLEY.